United States Patent

[11] 3,614,677

| [72] | Inventor | Raymond J. Wilfinger<br>Poughkeepsie, N.Y. |
|---|---|---|
| [21] | Appl. No. | 546,310 |
| [22] | Filed | Apr. 29, 1966 |
| [45] | Patented | Oct. 19, 1971 |
| [73] | Assignee | International Business Machines<br>Corporation<br>Armonk, N.Y. |

[54] ELECTROMECHANICAL MONOLITHIC RESONATOR
24 Claims, 16 Drawing Figs.

[52] U.S. Cl.................................................... 333/71,
310/4, 310/25, 317/234 R, 330/1 R, 330/16,
330/24, 331/156, 330/38 M, 350/285, 318/117,
321/1.5
[51] Int. Cl.................................................... H03h 9/04,
H03h 9/24
[50] Field of Search............................................ 317/235;
333/71; 310/4, 4.1, 25; 331/156; 34/1.5

[56] References Cited
UNITED STATES PATENTS
3,293,584  12/1966  Legat et al...................  338/2

| 3,277,698 | 10/1966 | Mason........................... | 73/885 |
| 3,328,649 | 6/1967 | Rindner et al. ................ | 317/234 |
| 3,378,648 | 4/1968 | Fenner.......................... | 179/100.41 |

*Primary Examiner*—Roy Lake
*Assistant Examiner*—Darwin R. Hostetter
*Attorneys*—Hanifin and Jancin and George O. Saile

ABSTRACT: A semiconductor substrate is supported so as to allow mechanical vibration of the substrate. This semiconductor substrate is of a size and has such electrical and mechanical characteristics as to be capable of sustaining mechanical stress and producing a useable resonance frequency. An excitation element is formed in the substrate at a suitable location to cause mechanical strain in the semiconductor substrate by a thermal expansion mechanism. The further addition of a device formed in the semiconductor substrate for converting mechanical stresses in the semiconductor substrate into electrical phenomena makes the semiconductor device of even greater value.

PATENTED OCT 19 1971 3,614,677
SHEET 1 OF 3
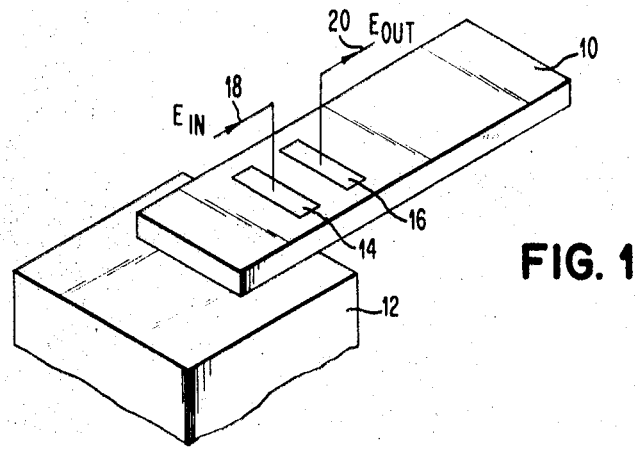
FIG. 1
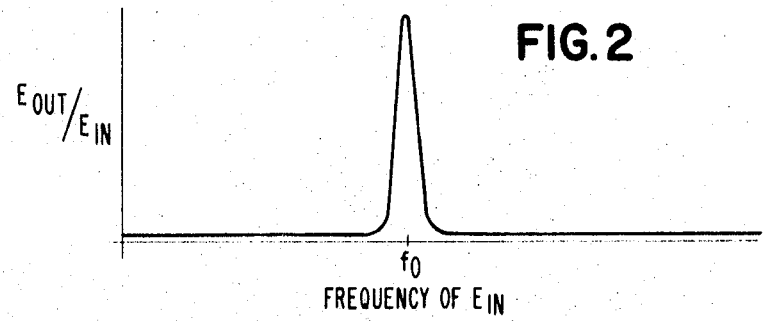
FIG. 2
FIG. 3
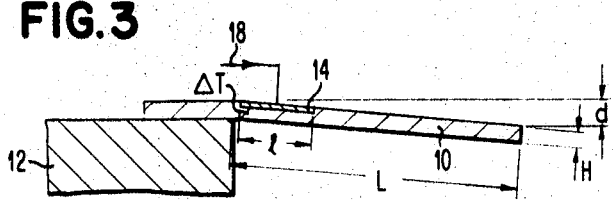
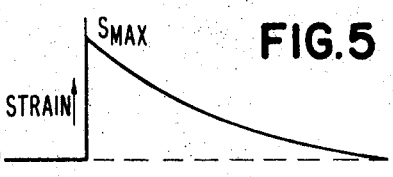
FIG. 5
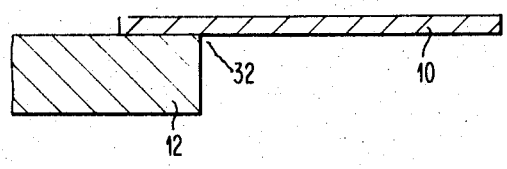
FIG. 4
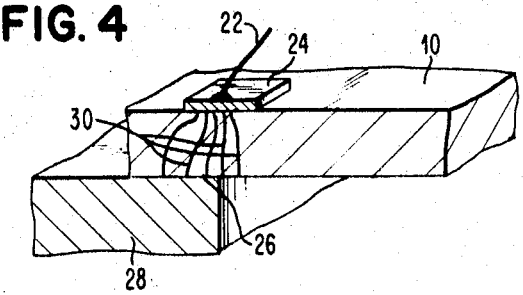
INVENTOR
RAYMOND J. WILFINGER
BY George O. Saile
ATTORNEY

PATENTED OCT 19 1971

ELECTROMECHANICAL MONOLITHIC RESONATOR

This invention relates to semiconductor devices and more particularly to a frequency-selective semiconductor device utilizing the mechanical resonance of the semiconductor. The device used in an electronic circuit is effective in limiting the frequency response of the electronic circuit.

The advent of integrated monolithic circuitry has made possible important reductions in the size, weight and cost of electronic circuitry. There are limitations in the integrated approach, however, particularly in the fabrication of inductor and capacitor devices. Inductor and capacitor devices having electrical characteristics of large enough values to be widely useful cannot be made small enough in physical size to match the compactness of monolithic integrated circuit devices. Efforts to overcome this problem have generally led to the use of resistor-capacitor combinations which have the disadvantage of limiting the frequency range and stability of the electronic circuit. Other proposed solutions involve the use of piezoelectric electromechanical resonance devices which have limited application because they require the use of the lesser understood and used III–V semiconductor materials.

Semiconductor materials generally can be identified by the strong temperature dependence of their electrical characteristics. This characteristic greatly complicates the fabrication of stable frequency-determining electrical elements from semiconductors. The need for stable frequency-determining elements has historically been filled by resonant electromechanical devices such as quartz crystals, tuning forks and magnetostrictive devices. Although electromechanical techniques are characterized by stability greater than that required in general circuit applications, the disadvantages of pure electrical techniques in monolithics offers no easy alternative. For the same resonant frequency, electromechanical systems occupy less physical volume than pure electrical systems and therefore are more compatible in physical size with monolithic integrated circuit devices.

The prior art includes a number of potentially usable electromechanical transducer systems. Magnetic devices, such as solenoids fit in this category but they do not lend themselves to a circuit incorporated with monolithic integrated devices because of the physical size difference between these devices. The piezoelectric devices are another possibility but they are limited to nonhomopolar materials, such as III–V semiconductor compounds, and therefore present a compatibility problem with the widely used homopolar materials, germanium and silicon, which are widely and almost exclusively used in semiconductor devices. The use of the electrostriction phenomena, the electric field analogy to magnetostriction, has been suggested. However, while this phenomenon does exist in silicon and germanium, the constant of proportionality between the applied electric field and induced stress is so small in these materials as to make the phenomena impractical for semiconductor resonant devices.

It is thus an object of the present invention to provide a frequency-selective semiconductor device utilizing the mechanical resonance of a semiconductor substrate.

It is another object of this invention to provide a semiconductor device capable of having mechanical stress induced in its homopolar semiconductor component.

It is another object of this invention to provide a frequency-selective semiconductor device which is completely compatible in physical size and electrical characteristics with integrated monolithic circuits.

These objects are accomplished in accordance with the broad aspects of the present invention by providing a semiconductor substrate supported so as to allow mechanical vibration of the substrate. The semiconductor substrate must be of such a size and have such electrical and mechanical characteristics as to be capable of sustaining mechanical stress and producing a usable resonance frequency. An excitation element is formed in the substrate at a suitable location to cause mechanical strain in the semiconductor substrate by a thermal expansion mechanism. The further addition of a device formed in the semiconductor substrate for converting the mechanical stresses in the semiconductor substrate to electrical phenomena makes the semiconductor device of even greater value.

The semiconductor mechanical resonance device is completely compatible with integrated monolithic circuits using homopolar material as their substrates. This ability of fabricating tuned monolithic circuitry according to the same techniques as monolithic integrated circuits has the important advantages of similar physical size, identical materials and fabrication techniques.

The foregoing and other objects, features and advantages of the invention will be apparent from the following more particular description of the preferred embodiments of the invention, as illustrated in the accompanying drawings.

In the drawings:

FIG. 1 illustrates a first embodiment in the flexual mode of the present semiconductor device;

FIG. 2 is a graph showing the electrical transfer characteristics typical for the device of FIG. 1;

FIG. 3 is an exaggerated view of the FIG. 1 device during thermal stress;

FIG. 4 is a diagram showing the region of excitation where the bulk resistance of the semiconductor itself is used as the excitation element;

Figure 6:
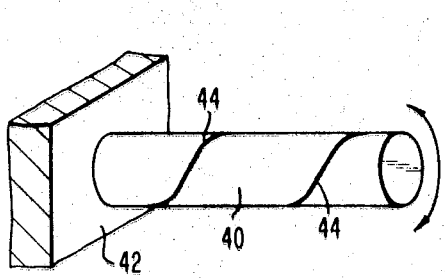
Figure 7:
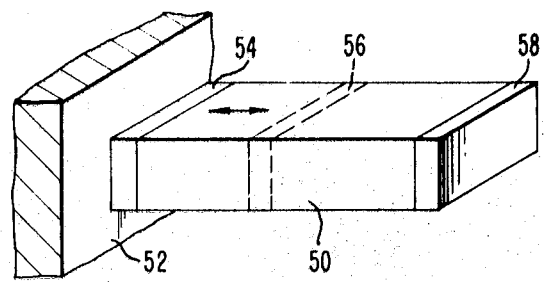
Figure 8:
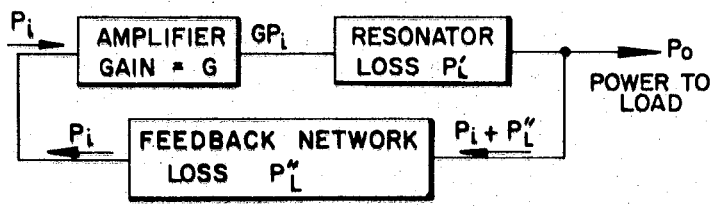
Figure 8:
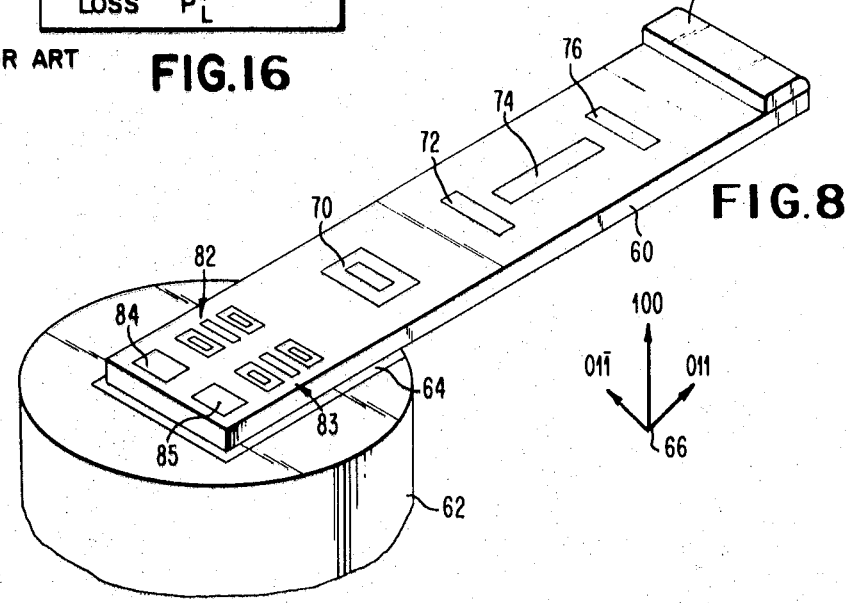
Figure 9:
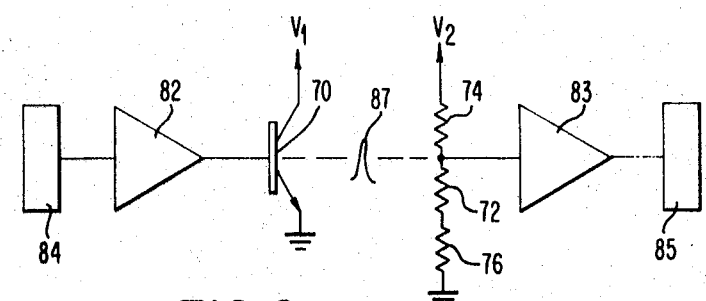
Figure 10:
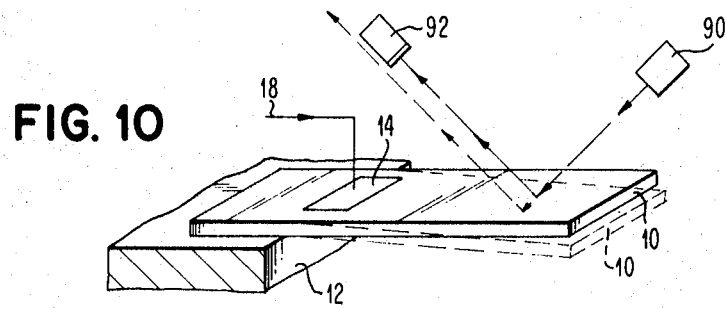
Figure 11:
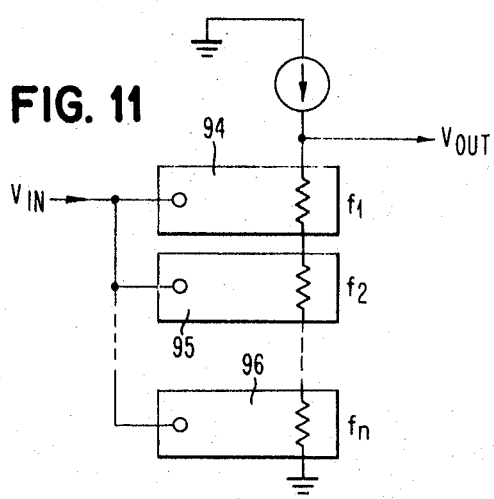
Figure 12:
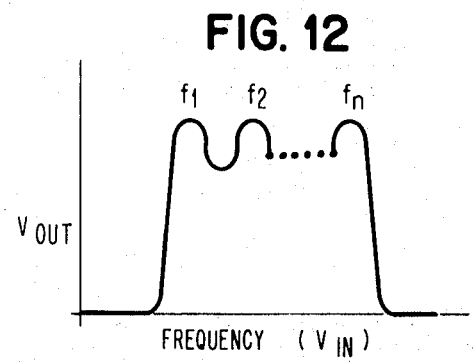
Figure 13:
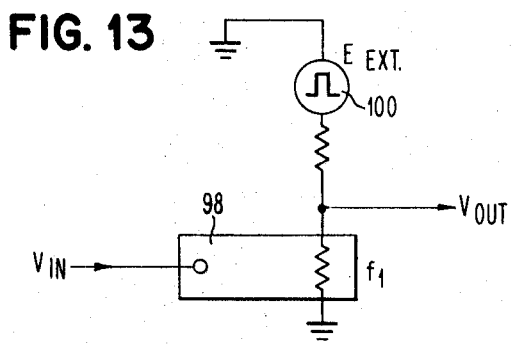
Figure 14:
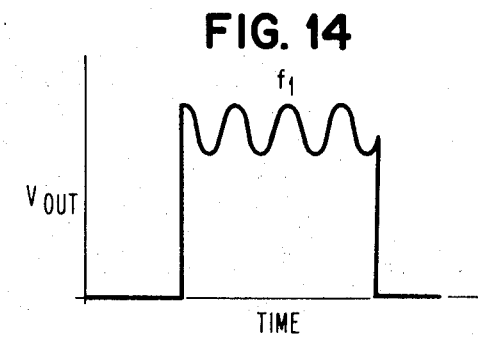
Figure 15:
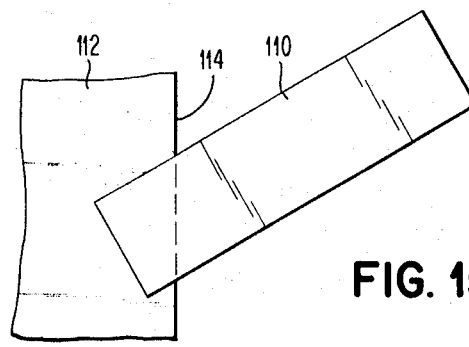

FIG. 5 graphically illustrates the stress distribution along the length of the FIG. 1 embodiment of the present invention;

FIG. 6 illustrates a second embodiment of the invention;

FIG. 7 illustrates a third embodiment of the invention;

FIG. 8 illustrates a preferred embodiment of the present invention;

FIG. 9 illustrates a block diagram of the preferred structure illustrated in FIG. 8;

FIG. 10 illustrates a light-deflecting device using the principles of the present invention;

FIG. 11 is a band-pass filter circuit utilizing the device of the present invention;

FIG. 12 is a graphical illustration of the electrical characteristics of the FIG. 11 circuit;

FIG. 13 is a circuit configuration utilizing the resonant device of the present invention;

FIG. 14 is a graphic illustration of the electrical characteristics of the FIG. 13 circuit;

FIG. 15 is an illustration of an alternative supporting structure for the substrate to reduce the device Q; and FIG. 16 is a diagrammatic representation illustrating the prior art basic elements of an oscillator circuit.

Referring now more particularly to FIG. 1, the flexual mode of the present device is shown. A simple cantilevered semiconductor substrate 10 is attached to a pedestal or support 12 at one end of the cantilever. An excitation element 14 is formed in the semiconductor substrate 10 by conventional semiconductor techniques, such as diffusion or epitaxial deposition. A sensor element 16 is formed at some point down the cantilever away from the excitation element 14. The sensor element is also formed by conventional semiconductor fabrication techniques in the semiconductor substrate. Electrical contacts 18 and 20 are made, respectively, to the excitation element and sensor element. Electrical power is dissipated in the excitation element 14 by application of an appropriate potential across the excitation element through electrical connection 18. The electrical power dissipation in the form of heat in the semiconductor substrate at the excitation element 14 causes the cantilevered structure to deflect downward slightly due to the greater thermal expansion at the upper surface in the vicinity of the excitation element 14. The stress induced produces a small output from the strain sensor 16. If the power in the excitation element increases and decreases in a periodic manner, a frequency may be chosen which causes reinforcement of the cyclic deflections by the mechanical restoring force of the cantilever. The result is the production of greater deflection and stress which is the characteristic of resonance. At this unique resonant frequency a markedly increased output is detected by the strain sensor 16.

FIG. 2 illustrates the electrical transfer characteristics typical of the FIG. 1 device. The frequency, $f_o$, corresponds to the mechanical resonant frequency of the device.

Fig. 3 is a representation which is useful in visualizing the effect of the excitation element, regardless of the particular type utilized, upon the semiconductor substrate excited in the flexual mode. The cantilever semiconductor substrate 10 is supported or clamped at one end to a pedestal 12 as in the FIG. 1 embodiment. Current is supplied to the excitation element 14 through a diagrammatically shown electrical connection 18. The electrical power dissipated in the excitation element 14 produces a thermal gradient $\Delta T$ between the upper and lower surfaces of the cantilever 10. As a result of the thermal gradient the upper surface expands causing a downward deflection, $d$, of the cantilever. An approximation of the displacement, $d$, may be determined from the expression: $d = L H / l \Delta T \epsilon Q$ where $L$ and $H$ are the length and thickness of the cantilever substrate respectively, $l$ is the length of the excitation element, $\epsilon$ is the thermal coefficient of expansion of the cantilever semiconductor material, $\Delta T$ is the temperature gradient across the thickness of the cantilever substrate 10 and is proportional to the power dissipated in the excitation element 14, and $Q$ is the reciprocal of the log decrement of the vibrating cantilever substrate. For example a silicon cantilever having dimensions of 350 mils long and 10 mils thick with a 5 mil long excitation element will deflect approximately 0.3 mils when the element is driven at the resonant frequency with 30 milliwatts and the cantilever $Q$ is 700. A germanium cantilever has a 50 percent smaller value of $\epsilon$ but its thermal resistance is almost twice as great as silicon resulting in a comparable deflection for germanium. It has been found that the resonant frequency of the cantilever substrate essentially decreases with the square of the length and increases in direct proportion with the thickness. The addition of a weight to the cantilever decreases the frequency.

The excitation element 14 can take any one of several forms which include an electrical resistance element at the surface of the semiconductor substrate 10, an electrical resistance established through the body of the semiconductor 10, a forward-biased PN junction device established within the body of the semiconductor and the collector power dissipation of a transistor formed in the semiconductor body 10. The use of bulk resistance, PN junction or transistor collector dissipation excitation elements differ only in the manner of generating the thermal gradient $\Delta T$ but the final manifestation remains the same. The use of the bulk resistance of the semiconductor substrate 10 as the excitation element can be more fully understood with reference to FIG. 4. The excitation current flows through the electrical connection 22 to the first ohmic contact 24 made to the semiconductor substrate 10 and returns to the source by a second ohmic contact 26 through the support or clamping means 28. Immediately upon entering the semiconductor bulk 10 through the first ohmic contact 24, the current is confined to a small area. However, as the current moves further into the semiconductor bulk, spreads further into the bulk as it progresses towards the second ohmic contact 26. Effectively the greater resistance in the confined region 30 produces greater heating in that region and a temperature gradient is produced through the thickness of the semiconductor material.

The excitation element can be further modified to include excitation elements at both upper and lower surfaces. This pair of excitation elements are then driven electrically out of phase to provide a deflecting force twice each cycle. Another possible modification is the use of selective heating elements using other thermal effects such as Peltier effect.

The sensor element 16 for detecting mechanical strain in the semiconductor substrate can also be of various structures, such as piezoresistors and piezo PN junctions. Semiconductor piezoresistors are extremely sensitive strain sensors having outputs which are relatively linear with the applied strain. The sensitivity of semiconductor piezoresistors is governed by the semiconductor material used, the doping agents, degree of doping and the crystal orientation of the semiconductor. There also is the problem of temperature sensitivity in semiconductor piezoresistors because such resistors are also, of necessity, semiconductor resistors. This thermal sensitivity can be reduced by proper electrical circuit design in which, by proper orientation of the piezoresistors, the resistance changes due to thermal effects are cancelled and the effect due to strain, enlarged.

FIG. 5 represents graphically the stress distribution along the length of the simple clamped cantilever substrate 10. The maximum strain occurs at the clamped line 32 and decays to zero at the unsupported end of the cantilever semiconductor substrate. If maximum output is to be achieved from the strain-detecting or sensor device it must be located in the vicinity of the line where the substrate begins to be suspended from the pedestal. However, maximum excitation efficiency also occurs when the excitation element is located in the region of this line. Therefore, a compromise must be made in locating the two elements in the semiconductor substrate so that maximum transfer efficiency is achieved without increasing the undesired electrical and thermal coupling between the two elements. The physical shape of the cantilevered semiconductor substrate may be altered or a mass may be added to the unsupported end of the cantilevered substrate to redistribute stress along the length of the substrate to this advantage.

The simple clamped cantilever structure of FIGS. 1 through 5 has been used to describe the basic structure of the semiconductor device of the present invention. However, other mechanical configurations and modes of operation of the semiconductor device of the invention are possible and operate in conformity to the identical principles described above in relation to the simple cantilever structure. The mode of vibration induced by deflecting the cantilever is the flexual mode. The flexual mode, however, exists in a number of mechanical structures other than the simple cantilever. The torsional and acoustic modes are two other distinct modes of vibration in which the present invention can be operated.

FIG. 6 presents a second embodiment which is a semiconductor device structure that lends itself to excitation in the torsional mode. The cylindrical-shaped semiconductor substrate or coupling media 40 is supported at one end by a pedestal or clamping means 42. Excitation and sensor elements are located on the surface along a spiral line 44 oriented at 45° to the longitudinal axis of the cylindrical body 40. The excitation and sensing elements are as in the first embodiment preferably formed in the semiconductor substrate. There may be one or several of each of these elements along the line 44. The effect of the excitation elements is to produce a mechanical twisting motion in the cylinder.

FIG. 7 illustrates one form of a semiconductor device structure that can be operated in the acoustic mode. The semiconductor substrate or coupling media 50 is supported at one end by a clamp or pedestal 52. The excitation element 54 which is formed in one end of the semiconductor substrate 50 produces an acoustic stress wave, which is generally indicated as line 56, which propagates in the direction shown by the arrow to a strain detector or sensor element 58 which is formed in the opposite end of the semiconductor substrate by conventional fabrication techniques, such as diffusion or epitaxial growth.

The following table gives a comparison of the first order modes of resonant frequencies of a few of the resonant structures which all have the same physical dimensions and normalized to the simple clamped cantilever structure. In the table the normalized frequencies are valid for all semiconductor materials except the normalized frequency given for the acoustical mode which only applies for a silicon semiconductor substrate.

TABLE

Higher order modes within the flexual mode may also be used to achieve higher resonant frequencies. For example, a second order mode of the clamped cantilever substrate is 6.27 times the fundamental or first order mode.

The coupling media for semiconductor substrate can be of any semiconductor material. These materials include both homopolar and nonhomopolar materials. This gives the designer the great advantage of using the identical material for the electromechanical resonator device which is used in associated monolithic integrated circuits and thereby allowing compatibility of the resonator device with the integrated circuit device.

A preferred embodiment of the present resonator device is illustrated in FIGS. 8 and 9. The silicon semiconductor cantilever device 60 is attached to the pedestal 62 by means of a suitable conductive metal, such as gold-silicon eutectic alloy 64. The preferred crystal orientation of the silicon monocrystal is given at 66. This orientation is preferred since it has been found to produce the best possible strain sensor element. A weight structure 68 is positioned at or near the unsupported end of the cantilever substrate 60 to redistribute the strain produced in the substrate and to reduce the resonant frequency of the substrate. For a double-supported cantilever substrate the weight would be positioned at or near the center of the substrate. The material used as the weight 68 can be any material which can be conveniently deposited on or otherwise attached to the silicon substrate and which has no adverse effect upon the electrical components which are formed in the silicon substrate 60. Such metals as gold, platinum and tungsten are usable as the weight 68. A transistor 70 fabricated in the semiconductor substrate 60 by conventional diffusion techniques serves as the excitation element and is positioned just adjacent to the support in the suspended portion of the substrate to maximize driving efficiency of the substrate. Three piezoresistor elements 72, 74 and 76 have been established in close proximity to the transistor 70 but further along the suspended portion of the substrate. The piezoresistors 72 and 76 are about one-half the ohmic value of the piezoresistor 74 and both piezoresistors 72 and 76 have piezo coefficients of substantially equal magnitude but opposite in sign of the piezoresistor 74. Piezoresistors 72 and 76 are wired electrically in series in turn with piezoresistor 74. The electrical juncture of piezoresistor 74 with the piezoresistors 72 and 76 provides an output terminal that is relatively insensitive to temperature variations due to the illustrated geometric configuration of the three piezoresistors. The areas 82 and 83 of the silicon cantilever substrate contain transistor and resistor devices which are so connected to provide an integrated amplifier within the semiconductor substrate for input or output signals to the semiconductor resonator device. The use of these integrated amplifiers is, of course, optional. Metallized conductive patterns 84 and 85 on the surface of the substrate make electrical connection to the various points of circuitry on the cantilever substrate. These patterns are connected by any conventional bonding technique, such as thermocompression bonding, to external device contacts. The FIG. 9 gives the electrical block diagram using corresponding numbers with FIG. 8 provided in the electromechanical monolithic resonator of FIG. 8. The transfer coefficient 87 indicated in FIG. 9 represents the resonant vibration of the substrate in FIG. 8.

An example of an operating semiconductor device fabricated as described differs slightly from the device shown in FIG. 8. The excitation element consisted of a 5,000ohm resistor diffused in the upper surface of 350 ×90 ×8 mil cantilever silicon substrate in place of the transistor 70. The sensor consisted of four piezoresistors diffused in the substrate surface and wired to form a bridge circuit that has two piezoresistores of opposite signed piezo coefficients forming a bridge arm. A mass of 2.5 milligrams of gold was deposited on the unsupported end of the substrate. The input excitation resistor was supplied with 100- milliwatt DC and 5.25-milliwatt AC power. The AC output voltage measured was 3 millivolts. The resonant frequency of the silicon cantilever was 1.414 kc. The Q was measured to be in excess 1500.

FIG. 10 illustrates an application of the resonator device as a light deflection device. This application does not require a sensor element in the substrate. A light source 90 projects a light, which can be visible or otherwise, onto the cantilever substrate 10. A light detector 92 is so positioned as to detect the existence or absence of light reflecting from the substrate depending upon the resonant frequency of the substrate 10. The substrate shown in dashed lines shows the condition where the reflected light does not reach the light detector.

Other applications for the resonator device include narrow band filters and oscillators. A band-pass filter can be formed by use of multiple resonators such as the cantilevered substrates 94, 95 and 96 shown in FIG. 11. The substrates are of different lengths and vibrate at frequencies, respectively, $f_1, f_2$ and $f_n$. They may be alternately mechanically coupled on the same pedestal or driven simultaneously. The resultant output can be summed electronically or wired in the manner shown in FIG. 11. The FIG. 12 shows the band-pass characteristic curve of the FIG. 11 block diagram. FIG. 13 is a diagram showing the resonator 98 of this invention keyed by external pulse source 100 to produce output pulse characteristic versus time shown in FIG. 14.

The $Q$ of practical devices made according to the principles of this invention measures from a few hundred up to two thousand and above. A theoretical upper limit of 10,000 to 100,000 exists FOR $Q$ because of internal atomic damping within the semiconductor substrate. A lower $Q$ can be obtained, for certain filter applications, by operating the substrate in a viscous fluid or by other subtle control of the substrate attachment to its pedestal. FIG. 15 shows one technique for positioning the substrate 110 to pedestal 112 which reduces the device $Q$. The cantilever substrate 110 is effectively divided into a number of mechanically coupled cantilevers of different lengths by mounting the substrate 110 at an angle with the pedestal support line 114.

FIG. 16 represents well known and basic electrical engineering theory with regard to oscillator operation and corresponds to a similar representation taken from the "Handbook of Semiconductor Electronics," Hunter, 1956, section-page 14-2. This prior art teaching describes the incorporation of filter and amplifying components into an oscillator combination.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A device comprising a member capable of flexing in response to a change in temperature and having a resonant frequency of flexing vibration, and means for heating said member to change the temperature and produce flexure thereof, said member and said heating means being mutually adapted to promote flexing vibration predominantly at said resonant frequency.

2. A device according to claim 1 in which the heating means comprises a semiconductor means attached to the member and electrical means for driving said semiconductor means.

3. A device according to claim 1 including means for abstracting an output from said member.

4. A device according to claim 3 in which the output-abstracting means comprises means for sensing changes in strain in the member.

5. A device according to claim 4 in which the member comprises an elongated member of semiconductive material, the heating means comprises a semiconductor means attached to the elongated member, and the output-abstracting means comprises a piezoresistive semiconductor diffused into said semiconductive material and provided with connections between which the resistance varies as a function of the strain in said material.

6. A device according to claim 1 in which the member comprises a reed of semiconductive material and nonresonant means for supporting said reed, and in which the heating means comprises a resistive element heat coupled to said reed and electrical means for driving resistive element to heat said reed, said device including means for coupling an output from said reed.

7. A device according to claim 6 in which the resistive element comprises a first semiconductor resistive element contacting the material of the reed and the output-coupling means comprises a second piezo resistive element contacting the material of said reed, both in orientations to undergo changes of resistivity as the strain of said reed changes.

8. A device according to claim 1 wherein said member comprises a substrate and said substrate is excited in a flexual mold.

9. A device according to claim 8 wherein said substrate is excited in a torsional mold.

10. A device according to claim 8 wherein said substrate is excited in an acoustical mode.

11. A device according to claim 1 wherein said member comprises a substrate and said means for heating comprises an electrical resistance element at the surface of said substrate.

12. A device according to claim 1 wherein said member comprises a substrate and said means for heating includes an electrical resistance established through the body of said substrate.

13. The device according to claim 1 wherein said member comprises a substrate and said means for heating includes a forward bias PN junction device in said substrate.

14. A device according to claim 1 wherein said member comprises a substrate and said means for a heating is a transistor device in said substrate operated to cause collector power dissipation.

15. A device according to claim 1 further including at least one piezoresistor sensor element.

16. A device according to claim 1 wherein said member comprises a substrate and further including more than one piezoresistor sensor element positioned in said substrate geometrically so as to cancel out thermal and electrical effect between said piezoresistors and the means for heating said substrate.

17. A device according to claim 1 further including at least one piezo PN junction sensor element.

18. A device according to claim 1 wherein said member comprises a substrate composed of a homopolar semiconductor material.

19. A device according to claim 18 wherein said means for heating and said sensor element are located on the periphery of said substrate substantially on a 45° spiral line.

20. A filter comprising an elongated member capable of flexing in response to a change in temperature and having a resonant frequency of flexing vibration, means for heating said member to change the temperature and produce flexure thereof, said heating means including input terminals to which may be applied a signal having a plurality of frequencies including said resonant frequency and including means coupled between said input terminals and said elongated member for converting said signal to heat, said elongated member and said heating means being mutually adapted to promote flexing vibration predominantly at said resonant frequency, and means for coupling from said elongated member a signal responsive to the portion of said signal at said resonant frequency.

21. A filter according to claim 20 in which the elongated member comprises a reed of semiconductive material, said filter including nonresonant means for supporting the elongated member and electrical means for applying the signal having a plurality of frequencies to said member.

22. A filter according to claim 21 in which the means for coupling a signal from the elongated member comprises an element of semiconductor resistive material diffused into said reed, and an output circuit connected across the element, said output circuit including means for biasing said element to carry a current responsive to changes in strain in said reed while not having a substantial effect in driving said reed.

23. A filter according to claim 21 in which the reed has two longitudinal regions and means separating said regions for providing a substantial degree of thermal isolation from one another, the heating means and the means for coupling the signal from the reed being disposed in different ones of said regions.

24. In an oscillator a device comprising a member capable of flexing in response to a change in temperature and having a resonant frequency of flexing vibration, and means for heating said member to change the temperature and produce flexure thereof, said member and said heating means being mutually adapted to promote flexing vibration predominantly at said resonant frequency.